United States Patent
Seo (10) Patent No.: US 8,313,706 B2
(45) Date of Patent: Nov. 20, 2012

(54) GASKET, REACTOR USING THE SAME FOR SPIRAL SEALING AND MANUFACTURING METHOD THEREOF

(76) Inventor: Gyu Hyun Seo, Busan (KR)

( * ) Notice: Subject to any disclaimer, the term of this patent is extended or adjusted under 35 U.S.C. 154(b) by 140 days.

(21) Appl. No.: 12/935,992

(22) PCT Filed: Apr. 7, 2009

(86) PCT No.: PCT/KR2009/001795
§ 371 (c)(1),
(2), (4) Date: Oct. 1, 2010

(87) PCT Pub. No.: WO2009/128620
PCT Pub. Date: Oct. 22, 2009

(65) Prior Publication Data
US 2011/0027145 A1    Feb. 3, 2011

(30) Foreign Application Priority Data

Apr. 14, 2008 (KR) .................. 10-2008-0034167
Mar. 19, 2009 (KR) .................. 10-2009-0023663

(51) Int. Cl.
*F28D 21/00* (2006.01)
*F28D 7/10* (2006.01)
*B21D 39/00* (2006.01)

(52) U.S. Cl. ........ 422/205; 422/202; 165/154; 165/156; 165/160; 165/81; 29/455.1; 29/450; 29/451; 29/452

(58) Field of Classification Search .................. 422/202, 422/205; 165/154, 156, 159, 160, 193, 81; 29/455.1, 450, 451, 452
See application file for complete search history.

(56) References Cited

U.S. PATENT DOCUMENTS

| | | | |
|---|---|---|---|
| 2,915,292 A | * | 12/1959 | Gross .............................. 165/89 |
| 4,215,745 A | | 8/1980 | Tuckmantel |
| 4,351,390 A | | 9/1982 | Argyle et al. |
| 5,150,831 A | * | 9/1992 | Jordan et al. .................. 228/184 |

* cited by examiner

*Primary Examiner* — Walter D Griffin
*Assistant Examiner* — Lessanework Seifu
(74) *Attorney, Agent, or Firm* — John K. Park; Park Law Firm (57) ABSTRACT

Provided are a gasket, a reactor using the same for sealing a spiral, and a manufacturing method thereof. Spirials are continuously installed in the longitudinal direction between an inner pipe and an outer pipe coaxially arranged to form a flow path for a heat medium, so the seal between the spiral and the outer pipe is stably maintained and fabrication of the reactor is facilitated. The gasket is inserted in and coupled with the spiral, and thus does not need additional processing for combining the gasket. The gasket and spiral are coupled by lodging the spiral into a channel of the gasket. Furthermore, since the gasket is evenly coupled in the outer circumference of the spiral, in which a cushion plate made of resilient material is installed, breakage of the gasket during assembly of the outer pipe is effectively prevented and the post-assembly seal between the spiral and the outer pipe is stabilized.

9 Claims, 5 Drawing Sheets

100

GASKET, REACTOR USING THE SAME FOR SPIRAL SEALING AND MANUFACTURING METHOD THEREOF

TECHNICAL FIELD

The present invention relates to a gasket, a reactor using the gasket for sealing a spiral, and a manufacturing method of the reactor. More specifically, the present invention relates to an improvement of a spiral sealing mechanism of a reactor wherein spirals are continuously installed in the longitudinal direction between an inner pipe of a shell and an outer pipe of a jacket coaxially arranged to form a flow path for a heat medium, so that the seal between the spiral and the outer pipe is effectively maintained and fabrication of the reactor is facilitated.

BACKGROUND ART

A reactor or a high-pressure reactor is process equipment which is manufactured in various forms and is widely used in facilities like gas plants, refineries, alternative energy plants, chemical plants and power plants. Such a reactor is a device in which a chemical reaction occurs in a production process, and thus it is required that the reactor be designed in consideration of both a chemical resistance against reacting substances and a needed strength.

Figure 1:
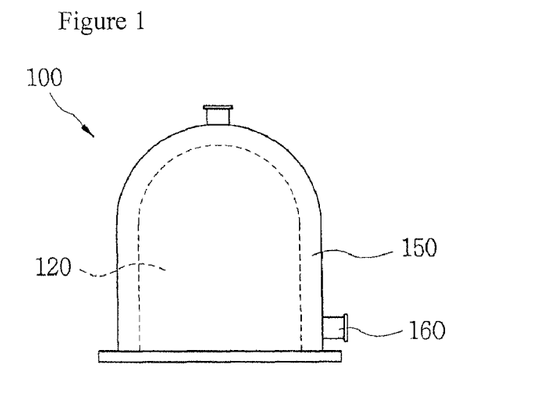
FIG. 1 is a diagrammatic view showing a conventional reactor constructed by applying two pipes coaxially arranged according to the prior art.
Figure 2:
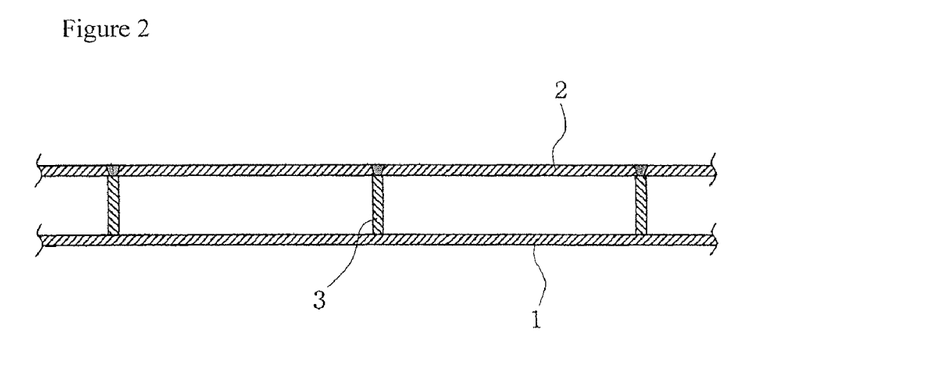
FIG. 2 is a diagrammatic view showing a conventional sealing mechanism used in the reactor shown in FIG. 1 according to the prior art.

In the meantime, as shown FIGS. 1 and 2, the most common one of reactors
is constituted by applying two coaxially arranged pipes, i.e., an inner pipe 1 of a shell 120 and an outer pipe 2 of a jacket 150.

More specifically, as shown in FIG. 1, the reactor 100 is constructed such that the shell 120 and the jacket 150 are coupled to each other to exchange the heat of a solution such as chemical fluid, etc. Also, as shown in FIG. 2, the shell 120 of the reactor 100 is configured such that spirals 3 are continuously installed in the longitudinal direction between an inner pipe 1 of the shell 120 and an outer pipe 2 of the jacket 150 coaxially arranged to form a flow path for a heat medium. Such a reactor 100 is assembled such that the jacket 150 can be separated from and coupled to the shell 120. Further, mounted respectively at the shell 120 and the jacket 150 is a nozzle 160 for allowing fluid to be introduced into and discharged from the reactor 100 therethrough.

In the reactor 100 as constructed above, fluid introduced into and discharged from the reactor 100 through the nozzle 160 flows through the inner pipe 1 of the shell 120, and a heat medium flows through the flow path defined as an annular space by the spirals 3 positioned between the inner pipe 1 and the outer pipe 2 such that heat exchange between the fluid and the heat medium is performed through the wall (i.e., heating surface) of the inner pipe 1.

In this case, the reactor 100 includes a sealing mechanism for sealing between the spirals 3 and the outer pipe 2. A conventional sealing method for the sealing mechanism is conducted by welding the spirals 3 and the outer pipe 2. This sealing mechanism allows a sealing function to be maintained between the spirals 3 and the outer pipe 2 secures fixation of the spirals 3 to the outer pipe 2 through the welding of the spirals 3 and the outer pipe 2

Thus, a manufacturing method of the reactor 100 according to the prior art is performed by welding the spirals 3 to the periphery of the inner pipe 1 in such a fashion that a sheet for forming the outer pipe 2 abuts against between the spirals and the inner pipe 1.

However, such a conventional reactor 100 entails a problem in that production efficiency decreases due to an increase in the amount of secondary processing works for assembling the outer pipe 2 and the spirals 3, in that the assembly work is difficult, in that the risk of breakage of the spirals 3 and the outer pipe 2 during the assembly is high, and in that a secondary defect occurs after the completion of the assembly.

DISCLOSURE OF INVENTION

The present invention has been made in order to solve the above-mentioned problems occurring in the prior art, and it is an object of the present invention to provide a novel type of reactor using a gasket for sealing a spiral, a manufacturing method thereof, and a gasket therefor, which enable an improvement of a spiral sealing mechanism of the reactor wherein spirals are continuously installed in the longitudinal direction between an inner pipe of a shell and an outer pipe of a jacket coaxially arranged to form a flow path for a heat medium, so that the seal between the spiral and the outer pipe is effectively maintained and fabrication of the reactor is facilitated.

In particular, another object of the present invention is to provide a novel type of reactor using a gasket for sealing a spiral, a manufacturing method thereof, and a gasket therefor, in which spirals are mounted on the outer circumference of an inner pipe and an outer pipe is coveringly coupled onto the outer circumference of the spirals to define a flow path for a heat medium between the spirals and the outer pipe such that the necessity of additional processing of the spirals is eliminated, the assembly is facilitated, and the seal between the spiral and the outer pipe is stably maintained after the assembly of the outer pipe.

To achieve the above objects, according to one aspect, the present invention provides a reactor using a gasket for sealing a spiral, in which a shell 120 and a jacket 150 are coupled to each other, the shell and jacket including a nozzle 160 mounted respectively thereon for allowing fluid to be introduced into and discharged from the reactor 100 therethrough, wherein the reactor includes: one or more spirals 3 continuously installed in the longitudinal direction on the outer circumference of an inner pipe 1 such that the shell 120 is positioned between the inner pipe of the shell 120 and an outer pipe 2 of the jacket 150 coaxially arranged to form a flow path for a heat medium; and a gasket 10 coupled to the outer circumference of the spirals 3 so as to be positioned between the spirals 3 and the outer pipe 2 to seal the spirals 3.

In the reactor using a gasket for sealing a spiral according to the present invention, the gasket 10 includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

In the reactor using a gasket for sealing a spiral according to the present invention, the frame 20 of the gasket 10 may further include one or more incised grooves 28 formed on the both lateral sides 24 thereof in the longitudinal direction thereof in such a fashion as to be spaced apart from one another.

In the reactor using a gasket for sealing a spiral according to the present invention, the frame 20 of the gasket 10 may be formed by pressing a metal sheet made of a stainless steel material, and the cushion plate 40 may be formed of polytetra fluoroethylene (PTFE).

To achieve the above objects, according to another aspect, the present invention provides a manufacturing method of a reactor using a gasket for sealing a spiral, in which a shell 120 and a jacket 150 are coupled to each other, the shell and jacket including a nozzle 160 mounted respectively thereon for allowing fluid to be introduced into and discharged from the reactor 100 therethrough, the method including the steps of: a step of preparing an inner pipe 1 and an outer pipe 2 of the shell 120 sized to have a flow path 4 defined between the inner pipe 1 and the outer pipe 2 when the inner pipe 1 of the shell 120 and the outer pipe 2 of the jacket 150 are coaxially arranged; a step of installing one or more spirals 3 in the longitudinal direction on the outer circumference of the inner pipe 1 so as to be positioned within the flow path 4 to form a continuous flow path for a heat medium in the longitudinal direction of the inner pipe 1 and the outer pipe 2; a step of coupling a gasket 10 to the outer circumference of the spirals 3 so as to be positioned between the spirals 3 and the outer pipe 2 to seal the spirals 3; and a step of coupling the outer pipe 2 to the inner pipe 1 on which the spirals 3 and the gasket 10 are coupled to each other.

In the manufacturing method of a reactor using a gasket for sealing a spiral according to the present invention, the gasket 10 includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby in the step of coupling the gasket, the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

To achieve the above objects, according to yet another aspect, the present invention provides a gasket for a reactor 100 using a gasket for sealing a spiral, the reactor including an inner pipe 1 and an outer pipe 2 coaxially arranged and the spirals being continuously installed in the longitudinal direction on the outer circumference of the inner pipe 1 to form a flow path for a heat medium so that the sealing between the spirals 3 and the outer pipe 2 is maintained, wherein the gasket includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

In the gasket for a reactor using a gasket for sealing a spiral according to the present invention, the frame 20 of the gasket 10 may further include one or more incised grooves 28 formed on the both lateral sides 24 thereof in the longitudinal direction thereof in such a fashion as to be spaced apart from one another.

In the gasket for a reactor using a gasket for sealing a spiral according to the present invention, the frame 20 of the gasket 10 may be formed by pressing a metal sheet made of a stainless steel material, and the cushion plate 40 may be formed of polytetra fluoroethylene (PTFE).

EFFECT OF THE INVENTION

According to a reactor using a gasket for sealing a spiral, a manufacturing method thereof, and a gasket therefor of the present invention, since the gasket 10 is fittingly coupled to the outer circumference of the spirals positioned between the inner pipe 1 of the shell 120 and the outer pipe 2 of the jacket 150 to form a flow path for a heat medium, the assembly of coaxially arranging the inner pipe 1 and the outer pipe 2 is facilitated. That is, after the spirals 3 are installed on the outer circumference of the inner pipe 1 and the gasket 10 is assembled to the spirals 3, the outer pipe 2 is press-fitted onto the inner pipe 1. Thus, through the above sequential assembly, the fabrication of the reactor 100 is facilitated which includes the shell 120 formed by assembling the inner pipe 1 and the outer pipe 2 in a coaxial arrangement. Particularly, the gasket 10 includes the frame 20 and the cushion plate 40 whereby the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21. Accordingly, additional processing of the spirals 3 is not needed, the assembly is facilitated, breakage of the gasket (10) during assembly of the outer pipe (2) is effectively prevented and the post-assembly seal between the spiral (3) and the outer pipe (2) is stabilized.

BEST MODE FOR CARRYING OUT THE INVENTION

Figure 3:
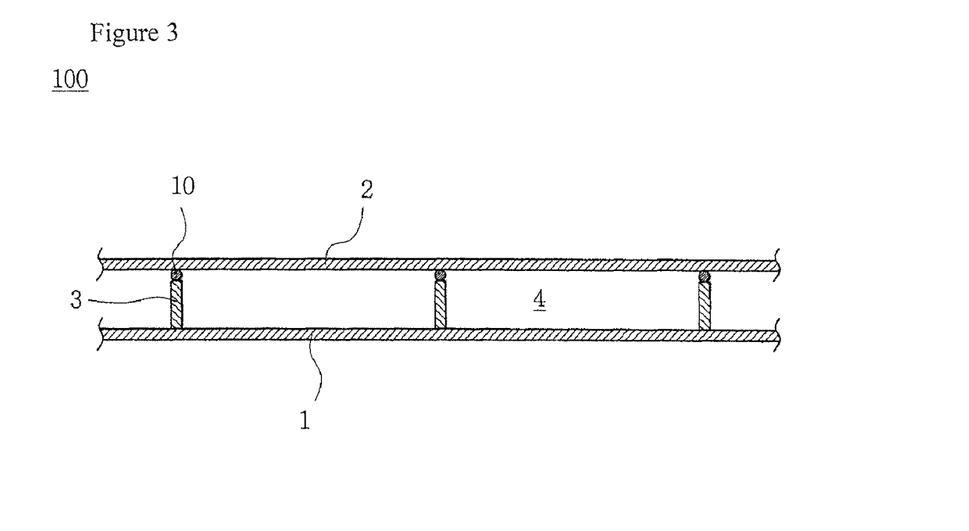
FIG. 3 is a diagrammatic view showing the main elements of a reactor using a gasket for spiral sealing according to the technical spirit of the present invention.
Figure 4:
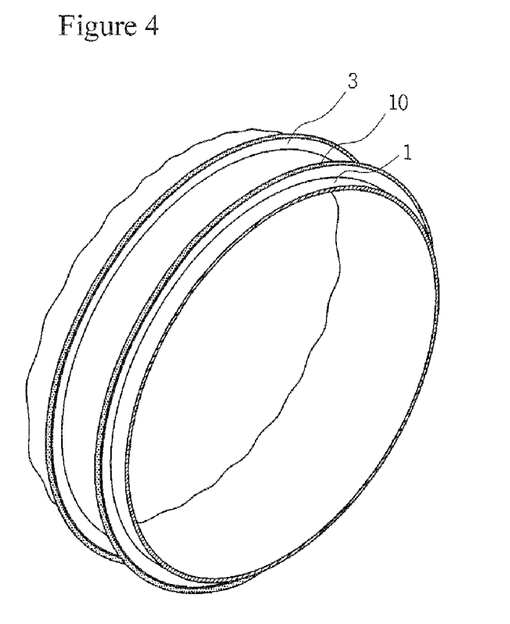
FIG. 4 is a perspective view showing a manufacturing method of a reactor using a gasket for spiral sealing according to the technical spirit of the present invention.

FIG. 3 is a diagrammatic view showing the main elements of a reactor using a gasket for spiral sealing and a gasket therefor according to the technical spirit of the present invention, and FIG. 4 is a perspective view showing a manufacturing method of a reactor using a gasket for spiral sealing according to the technical spirit of the present invention.

Referring to FIGS. 3 and 4, the reactor 100 according to the present invention is characterized in that since the gasket 10 is fittingly coupled to the outer circumference of the spirals positioned between the inner pipe 1 of the shell 120 and the outer pipe 2 of the jacket 150 to form a flow path for a heat medium, the assembly of coaxially arranging the inner pipe 1 and the outer pipe 2 is facilitated. That is, in the reactor 100 using a gasket for spiral sealing, a shell 120 and a jacket 150 are coupled to each other. In this case, the shell and jacket include a nozzle 160 mounted respectively thereon for allowing fluid to be introduced into and discharged from the reactor 100 therethrough. The reactor includes spirals 3 and a gasket 10. In this case, the spirals 3 are continuously installed in the longitudinal direction on the outer circumference of an inner pipe 1 such that the shell 120 is positioned between the inner pipe 1 and an outer pipe 2 coaxially arranged to form a flow path for a heat medium. Also, the gasket 10 is coupled to the outer circumference of the spirals 3 so as to be positioned between the spirals 3 and the outer pipe 2 to seal the spirals 3.

In this case, the spirals 3 applied to the present invention may be formed in various forms as in preferred embodiments of the present invention. For example, spirals 3 applied to the reactor 100 shown in FIG. 7 according to a preferred embodiment of the present invention are formed in a straight shape in cross-section (i.e., cross-section perpendicular to the longitudinal direction along a coaxis of the inner pipe 1 and the outer pipe 2. The spiral 3 is formed on the inner pipe by helically joining (typically welding) a sheet along the outer circumference of the inner pipe 1. Also, for example, spirals 3 applied to a reactor 100 shown in FIG. 11 according to a preferred embodiment of the present invention have a "T" shape in cross-section.

In addition, the gasket 10 applied to the present invention may adopt gaskets of various forms to seal a gap between the spirals and the outer pipe. For example, a gasket 10 which can be applied to the present invention may adopt an O-ring provided in various standards as shown in a preferred embodiment of FIGS. 10 and 11. Alternatively, the gasket 10 may adopt a dedicated gasket 100 having the same structure as that shown in FIGS. 5 to 9 to facilitate the assembly of the outer pipe 2 and stably achieve the sealing effect.

A method of manufacturing a reactor using a gasket for spiral sealing according to the present invention can improve convenience in the fabrication of the reactor. That is, a manufacturing method of a reactor using a gasket for sealing a spiral will be described hereinafter in detail.

First, an inner pipe 1 of the shell 120 and an outer pipe 2 of the jacket 150 are prepared which are sized to have a flow path 4 defined between the inner pipe 1 and the outer pipe 2 when the inner pipe 1 and the outer pipe 2 are coaxially arranged. Then, spirals 3 are installed in the longitudinal direction on the outer circumference of the inner pipe 1 so as to be positioned within the flow path 4 to form a continuous flow path for a heat medium in the longitudinal direction of the inner pipe 1 and the outer pipe 2. Thereafter, a gasket 10 is coupled to the outer circumference of the spirals 3 so as to be positioned between the spirals 3 and the outer pipe 2 to seal the spirals 3. Subsequently, the outer pipe 2 is coupled to the inner pipe 1 on which the spirals 3 and the gasket 10 are coupled to each other.

The manufacturing method of a reactor using a gasket for spiral sealing according to the present invention has advantage in that the assembly is relatively facilitated and durability of the outer pipe 2 increases further as compared to the conventional manufacturing method. That is, in a manufacturing method of the reactor adopting the conventional spirals 3, a method is used in which the spirals 3 are installed on the inner pipe 1 and the outer pipe 2 is partially installed on the inner pipe 1. However, this conventional manufacturing method encounters a drawback in that since welding is employed in installing the outer pipe 2, the manufacture of the reactor is very difficult and work time increases. On the contrary, the manufacturing method of a reactor according to the present invention has an advantage in that since the inner pipe 1 and the outer pipe 2 can be assembled in a coaxial arrangement by being formed integrally with each other, the assembly of the reactor 100 is very easy as well as durability of the outer pipe 2 can be stably secured.

In the meantime, the operation of assembling the inner pipe 1 and the outer pipe 2 in a coaxial arrangement to constitute the shell 120 and assembling the shell 120, the jacket 150 and other elements constituting the reactor 100 is the same as that in the manufacture method of the reactor performed generally by those skilled in the art, and thus its detailed description will be omitted for brevity.

Now, a preferred embodiment of the present invention will be described hereinafter in more detail with reference to FIGS. 5 to 11.

In FIGS. 1 to 11, elements performing the same function are denoted by identical reference numerals. In the meantime, in the accompanying drawings, illustration of reinforcing ribs (plates), bolts, screws, holes, washers, nuts and the like for coupling/fixing main elements is simplified or omitted. Also, portions which can be understood by those skilled in the art such as the construction and operation of a typical reactor are not shown, and only portions related with the present invention are shown. In particular, although ratios of sizes between elements are represented somewhat differently or sizes between mutually coupled parts are partly represented differently, a difference in representation between the elements or parts can be easily understood by those skilled in the art and thus its additional description will be omitted to avoid redundancy.

Figure 5:
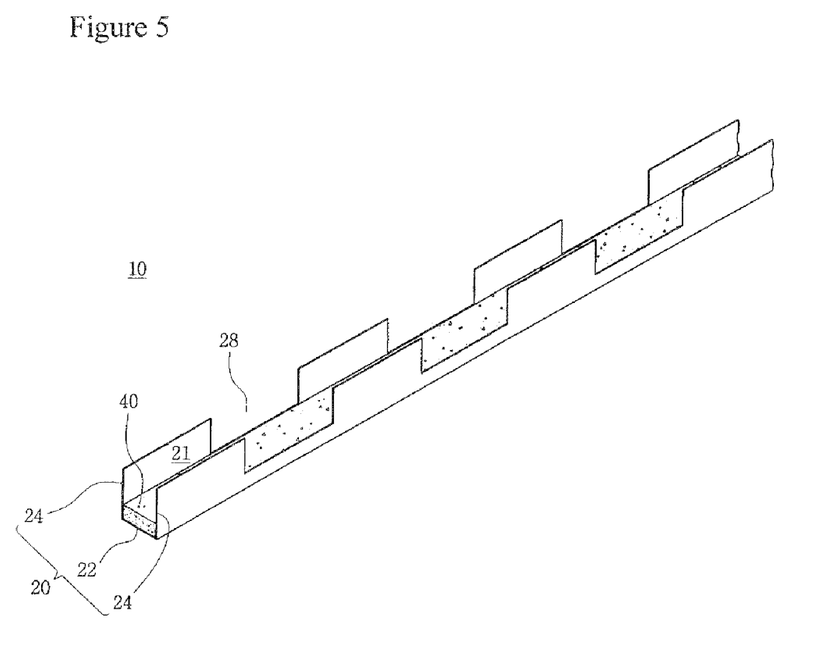
FIG. 5 is a perspective view showing a reactor using a gasket for spiral sealing according to a preferred embodiment of the present invention.
Figure 6:
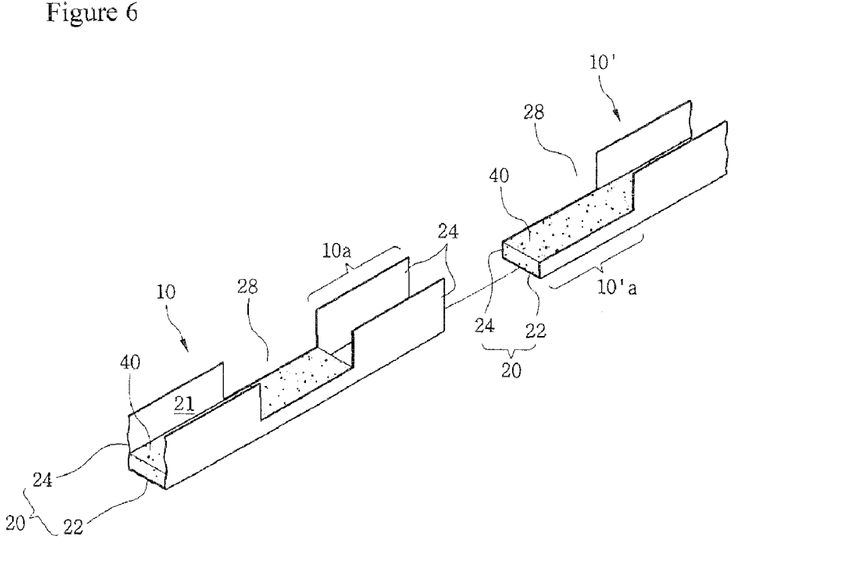
FIG. 6 is a perspective view showing a coupling structure of the reactor shown in FIG. 5 according to a preferred embodiment of the present invention.
Figure 7:
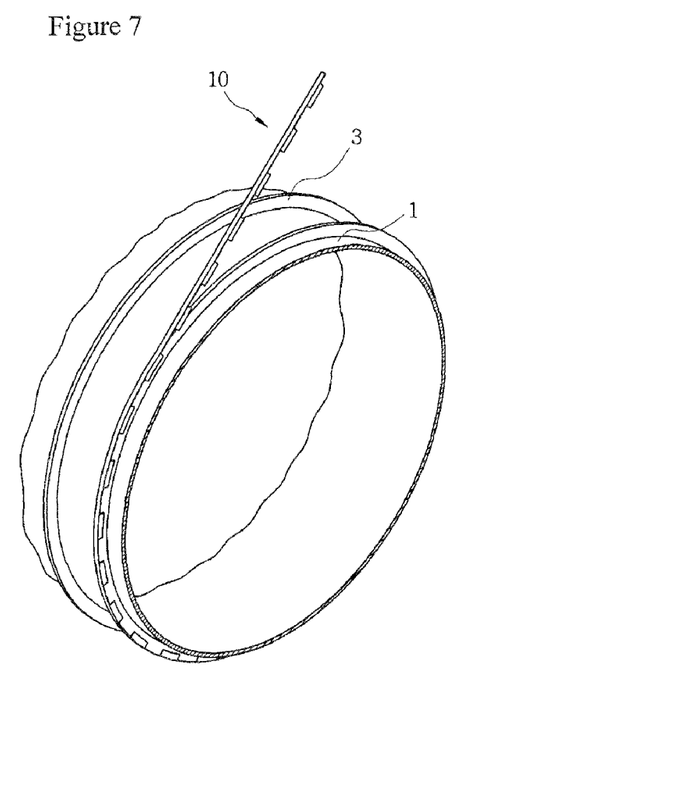
FIGS. 7 and 8 are perspective views showing a state in which a gasket according to a preferred embodiment of the present invention is assembled to spirals.
Figure 8:
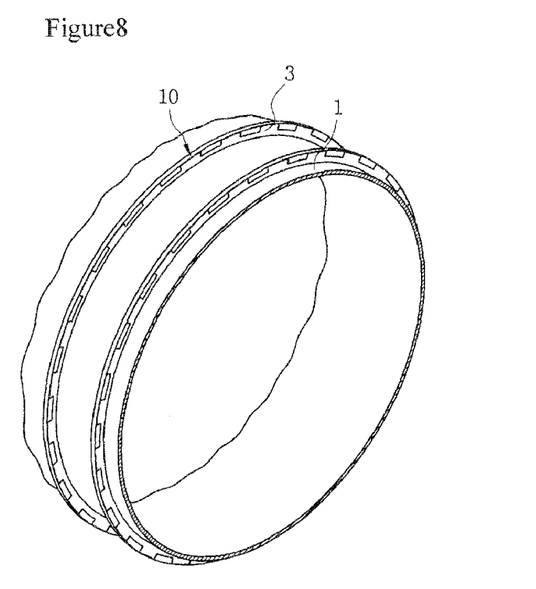
Figure 9:
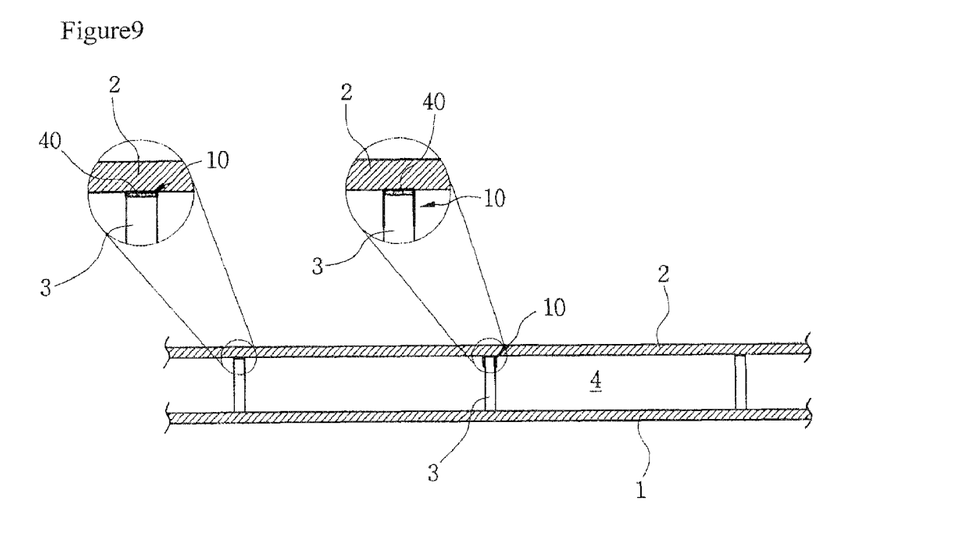
FIG. 9 is a diagrammatic view showing a reactor constructed by using the gasket shown in FIG. 5.

FIG. 5 is a perspective view showing a reactor using a gasket for spiral sealing according to a preferred embodiment of the present invention, FIG. 6 is a perspective view showing a coupling structure of the reactor shown in FIG. 5 according to a preferred embodiment of the present invention, FIGS. 7 and 8 are perspective views showing a state in which a gasket according to a preferred embodiment of the present invention is assembled to spirals, and FIG. 9 is a diagrammatic view showing a reactor constructed by using the gasket shown in FIG. 5.

Referring to FIGS. 5 and 9, a gasket 10 for a reactor using a gasket for spiral sealing according to the present invention includes a frame 20 and a cushion plate 40 so that both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

Since the gasket 10 has a structure of being press-fitted onto the spirals, it does not need additional processing for the coupling of the gasket 10. Thus, as shown in FIGS. 7 and 8, in the manufacture of the reactor 100 (see FIGS. 1 and 9), since the gasket 10 and the spirals 3 are coupled to each other by press-fitting the spirals 3 into a channel 21 of the gasket 10, the assembly is facilitated. Furthermore, since the gasket 10 is evenly coupled to the outer circumference of the spirals 3, in which a cushion plate 40 made of resilient material is installed, breakage of the gasket 10 during assembly of the outer pipe 2 is effectively prevented and the post-assembly seal between the spiral 3 and the outer pipe 2 is effectively maintained.

More specifically, the reactor 100 using a gasket for spiral sealing according to a preferred embodiment of the present invention is constructed such that the gasket 10 is press-fittingly coupled to the outer circumference of the spirals 3 installed on the outer circumference of the inner pipe 1 as shown in FIG. 5 and the outer pipe 2 is coveringly coupled onto the outer circumference of the spirals 3 so as to define a flow path 4 for a heat medium by the spirals 3.

The gasket 10 used in the reactor 100 using a gasket for spiral sealing includes a specially designed frame 20 and a cushion plate 40. The frame 20 of the gasket 10 includes a bottom 22 and both lateral sides 24 so that the gasket is opened upwardly to define a channel 21 therein in the longitudinal direction thereof. The frame 20 is formed of a metal sheet so as to have a "U" shape in cross-section. Also, the cushion plate 40 is coupled to the bottom of the frame in the longitudinal direction of the frame 20 so as to be positioned within the channel 21. The cushion plate is formed of a synthetic resin material.

In this case, in this embodiment, the frame 20 includes a plurality of incised grooves 28 formed on the both lateral sides 24 thereof in the longitudinal direction thereof in such a fashion as to be spaced apart from one another so that an assembly error according to a processing error of the gasket 10 and the spirals 3 is absorbed. In other words, the gasket 10 is continuously coupled along the spirals installed on the inner pipe 1 in a typical spiral shape. In this process, since the gasket 10 is influenced by the assembly or processing error of the spirals 3, the frame 20 according to this embodiment absorbs the assembly or processing error of the spirals 3 during the assembly by forming incised grooves 28 on the both lateral sides 24 thereof at regular intervals. In this case, preferably, the incised grooves 28 are incised up to the height enough for the cushion plate 40 to be inserted the channel 21 so that the cushion plate 40 is stably supported by the frame 20, and the intervals between the incised grooves can be set depending on the need. The frame 20 can endure high heat and high temperature, and is made of a metal material having chemical resistance. In this embodiment, the frame 20 is preferably formed by pressing a metal sheet made of a stainless steel material so that convenience in fabrication of the reactor is improved.

Besides, the cushion plate 40 of the gasket 10 is formed of a compressible material so that the cushion plate 40 is compressed upon the assembly of the outer pipe 2 to the inner pipe 1 to increase a degree of adhesion of the gasket 10 to the spirals 3. Also, the cushion plate 40 functions to increase a sealing capacity between the outer pipe 2 and the spirals 3 by means of a restoring force thereof after the coupling of the outer pipe 2 to the inner pipe 1. The cushion plate 40 is preferably made of a synthetic resin material which can endure high pressure and high heat, is compressible and has a sufficient resilience. In this embodiment, the cushion plate 40 is formed of polytetra fluoroethylene (PTFE).

Meanwhile, the gasket 10 according to a preferred embodiment of the present invention is constructed in consideration of its continuous coupling to the spirals 3. For example, this construction of the gasket 10 corresponds to the cut portions during the manufacture of the gasket 10. That is, as shown in FIG. 6, a front-side gasket 10 coupled first is cut such that an incised groove is not formed on both lateral sides 24 of a connecting portion 10a, and the cushion plate 40 of the connecting portion 10a is removed. Further, a rear-side gasket 10' coupled subsequently to the front-side gasket 10 is cut such that an incised groove is formed on both lateral sides 24 of a connecting portion 10a'. Thus, since the connecting portion 10a' of the rear-side gasket 10' is fittingly coupled to the connecting portion 10a of the front-side gasket 10, stable and continuous coupling is enabled even without using a separate connecting structure.

Referring back to FIGS. 7 to 9, as described above, the reactor 10 using a gasket for spiral sealing according to the present invention provides a sequential assembly process while securing the sealing between the spirals 3 and the outer pipe 2 by applying a gasket 10 proposed to implement an excellent sealing mechanism, thereby improving convenience in fabrication of the reactor. That is, as shown in FIGS. 7 and 8, the manufacturing method of the reactor using a gasket for spiral sealing will be described hereinafter.

First, an inner pipe 1 and an outer pipe 2 are prepared which are sized to have a flow path 4 defined between the inner pipe 1 and the outer pipe 2 when the inner pipe 1 and the outer pipe 2 are coaxially arranged. Then, spirals 3 are installed in the longitudinal direction by spirally attaching a flat plate on the outer circumference of the inner pipe 1 so as to be positioned within the flow path 4 to form a continuous flow path for a heat medium in the longitudinal direction of the inner pipe 1 and the outer pipe 2. Thereafter, the gasket 10 as constructed above is coupled to the outer circumference of the spirals 3 so as to be positioned between the spirals 3 and the outer pipe 2 to seal the spirals 3. Subsequently, the outer pipe 2 is coupled to the inner pipe 1 on which the spirals 3 and the gasket 10 are coupled to each other.

Figure 10:
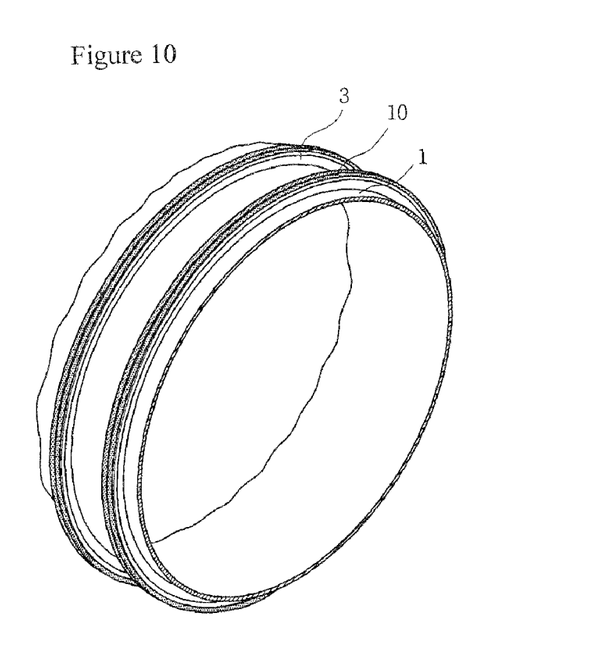
FIGS. 10 and 11 are views showing a reactor using a gasket for sealing a spiral, a manufacturing method thereof, and a gasket therefor according to another preferred embodiment of the present invention.
Figure 11:
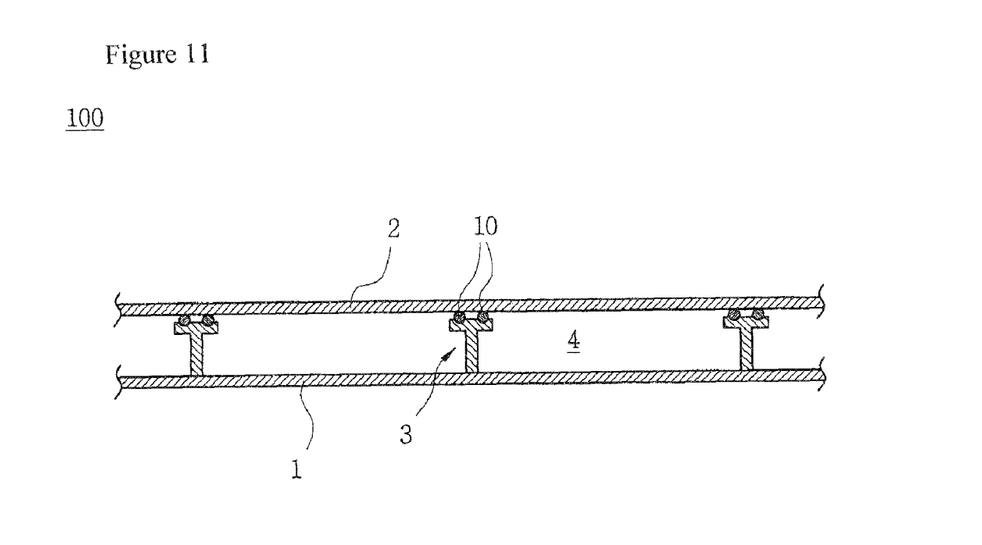

FIGS. 10 and 11 are views showing a reactor using a gasket for sealing a spiral, a manufacturing method thereof, and a gasket therefor according to another preferred embodiment of the present invention.

Referring to FIGS. 10 and 11, the reactor 100 using a gasket for spiral sealing according to a preferred embodiment of the present invention employs a typical O-ring as the gasket 10, and the spirals 3 adopt a sheet having a "T" shape in cross-section. The reactor 100 provides convenience in the manufacture.

While the reactor using a gasket for sealing a spiral, the manufacturing method thereof, and the gasket therefor according to the preferred embodiments of the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention.

Mode for Invention

To achieve the above objects, according to one aspect, the present invention provides a reactor using a gasket for sealing a spiral, in which a shell 120 and a jacket 150 are coupled to each other, the shell and jacket including a nozzle 160 mounted respectively thereon for allowing fluid to be introduced into and discharged from the reactor 100 therethrough, wherein the reactor includes: one or more spirals 3 continuously installed in the longitudinal direction on the outer circumference of an inner pipe 1 such that the shell 120 is positioned between the inner pipe 1 of the shell 120 and an outer pipe 2 of the jacket 150 coaxially arranged to form a flow path for a heat medium; and a gasket 10 coupled to the outer circumference of the spirals 3 so as to be positioned between the spirals 3 and the outer pipe 2 to seal the spirals 3.

In the reactor using a gasket for sealing a spiral according to the present invention, the gasket 10 includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

In the reactor using a gasket for sealing a spiral according to the present invention, the frame 20 of the gasket 10 may further include one or more incised grooves 28 formed on the both lateral sides 24 thereof in the longitudinal direction thereof in such a fashion as to be spaced apart from one another.

In the reactor using a gasket for sealing a spiral according to the present invention, the frame 20 of the gasket 10 may be formed by pressing a metal sheet made of a stainless steel material, and the cushion plate 40 may be formed of polytetra fluoroethylene (PTFE).

To achieve the above objects, according to another aspect, the present invention provides a manufacturing method of a reactor using a gasket for sealing a spiral, in which a shell 120 and a jacket 150 are coupled to each other, the shell and jacket including a nozzle 160 mounted respectively thereon for allowing fluid to be introduced into and discharged from the reactor 100 therethrough, the method including the steps of: a step of preparing an inner pipe 1 and an outer pipe 2 sized to have a flow path 4 defined between the inner pipe 1 and the outer pipe 2 when the inner pipe 1 of the shell 120 and the outer pipe 2 of the jacket 150 are coaxially arranged; a step of installing one or more spirals 3 in the longitudinal direction on the outer circumference of the inner pipe 1 so as to be positioned within the flow path 4 to form a continuous flow path for a heat medium in the longitudinal direction of the inner pipe 1 and the outer pipe 2; a step of coupling a gasket 10 to the outer circumference of the spirals 3 so as to be positioned between the spirals 3 and the outer pipe 2 to seal the spirals 3; and a step of coupling the outer pipe 2 to the inner pipe 1 on which the spirals 3 and the gasket 10 are coupled to each other.

In the manufacturing method of a reactor using a gasket for sealing a spiral according to the present invention, the gasket 10 includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby in the step of coupling the gasket, the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

To achieve the above objects, according to yet another aspect, the present invention provides a gasket for a reactor 100 using a gasket for sealing a spiral, the reactor including an inner pipe 1 and an outer pipe 2 coaxially arranged and the spirals being continuously installed in the longitudinal direction on the outer circumference of the inner pipe 1 to form a flow path for a heat medium so that the sealing between the spirals 3 and the outer pipe 2 is maintained, wherein the gasket includes: a frame 20 including a bottom 22 and both lateral sides 24 so that the gasket is opened upwardly to define a channel 21 therein in the longitudinal direction thereof, the frame being formed of a metal sheet so as to have a "U" shape in cross-section; and a cushion plate 40 coupled to the bottom of the frame in the longitudinal direction of the frame 20 so as to be positioned within the channel 21, the cushion plate being formed of a synthetic resin material, whereby the both lateral sides 24 of the frame 20 are fittingly coupled to both circumferential outer sides of the spirals 3 such that the cushion plate 40 abuts against the outer circumference of the spirals 3 in a state in which the spirals 3 are inserted into the channel 21.

In the gasket for a reactor using a gasket for sealing a spiral according to the present invention, the frame 20 of the gasket 10 may further include one or more incised grooves 28 formed on the both lateral sides 24 thereof in the longitudinal direction thereof in such a fashion as to be spaced apart from one another.

In the gasket for a reactor using a gasket for sealing a spiral according to the present invention, the frame 20 of the gasket 10 may be formed by pressing a metal sheet made of a stainless steel material, and the cushion plate 40 may be formed of polytetra fluoroethylene (PTFE).

Industrial Applicability

The present invention relates to relates to a gasket, a reactor using the gasket for sealing a spiral, and a manufacturing method of the reactor. More specifically, the present invention relates to an improvement of a spiral sealing mechanism of a reactor wherein spirals are continuously installed in the longitudinal direction between an inner pipe and an outer pipe coaxially arranged to form a flow path for a heat medium, so that the seal between the spiral and the outer pipe is effectively maintained and fabrication of the reactor is facilitated.

The invention claimed is:

1. A reactor using a gasket for sealing a spiral, in which a shell (120) and a jacket (150) are coupled to each other, the shell and jacket including a nozzle (160) mounted respectively thereon for allowing fluid to be introduced into and discharged from the reactor (100) therethrough,
wherein the reactor comprises:
one or more spirals (3) continuously installed in the longitudinal direction on the outer circumference of an inner pipe (1) such that the shell (120) is positioned between an inner pipe and an outer pipe coaxially arranged to form a flow path for a heat medium between the coaxially arranged inner pipe of the shell and the outer pipe of the shell; and
a gasket (10) coupled to the outer circumference of the spirals (3) so as to be positioned between the spirals (3) and the outer pipe (2) to seal the spirals (3),
wherein the gasket (10) comprises:
a frame (20) comprising a bottom (22) and both lateral sides (24) so that the gasket is opened upwardly to define a channel (21) therein in the longitudinal direction thereof, the frame being formed of a metal sheet so as to have a "U" shape in cross-section; and a cushion plate (40) coupled to the bottom of the frame in the longitudinal direction of the frame (20) so as to be positioned within the channel (21), the cushion plate being formed of a synthetic resin material, whereby the both lateral sides (24) of the frame (20) are fittingly coupled to both circumferential outer sides of the spirals (3) such that the cushion plate (40) abuts against the outer circumference of the spirals (3) in a state in which the spirals (3) are inserted into the channel (21).

2. The reactor according to claim 1, wherein the frame (20) of the gasket (10) further comprises one or more incised grooves (28) formed on the both lateral sides (24) thereof in the longitudinal direction thereof in such a fashion as to be spaced apart from one another.

3. The reactor according to claim 2, wherein the frame (20) of the gasket (10) is formed by pressing a metal sheet made of a stainless steel material, and the cushion plate (40) is formed of polytetra fluoroethylene (PTFE).

4. The reactor according to claim 1, wherein the frame (20) of the gasket (10) is formed by pressing a metal sheet made of a stainless steel material, and the cushion plate (40) is formed of polytetra fluoroethylene (PTFE).

5. A method of manufacturing a reactor using a gasket for sealing a spiral, in which a shell (120) and a jacket (150) are coupled to each other, the shell and jacket including a nozzle (160) mounted respectively thereon for allowing fluid to be introduced into and discharged from the reactor (100) therethrough, the method comprising the steps of:

a step of preparing an inner pipe (1) and an outer pipe (2) of the shell (120) sized to have a flow path (4) defined between the inner pipe (1) and the outer pipe (2) when the inner pipe (1) and the outer pipe (2) are coaxially arranged;

a step of installing one or more spirals (3) in the longitudinal direction on the outer circumference of the inner pipe (1) so as to be positioned within the flow path (4) to form a continuous flow path for a heat medium in the longitudinal direction of the inner pipe (1) and the outer pipe (2);

a step of coupling a gasket (10) to the outer circumference of the spirals (3) so as to be positioned between the spirals (3) and the outer pipe (2) to seal the spirals (3); and a step of coupling the outer pipe (2) to the inner pipe (1) on which the spirals (3) and the gasket (10) are coupled to each other, wherein the gasket (10) comprises:

a frame (20) including a bottom (22) and both lateral sides (24) so that the gasket is opened upwardly to define a channel (21) therein in the longitudinal direction thereof, the frame being formed of a metal sheet so as to have a "U" shape in cross-section; and a cushion plate (40) coupled to the bottom of the frame in the longitudinal direction of the frame (20) so as to be positioned within the channel (21), the cushion plate being formed of a synthetic resin material, whereby in the step of coupling the gasket, the both lateral sides (24) of the frame (20) are fittingly coupled to both circumferential outer sides of the spirals (3) such that the cushion plate (40) abuts against the outer circumference of the spirals (3) in a state in which the spirals (3) are inserted into the channel (21).

6. A gasket for a reactor (100) using a gasket for sealing a spiral, the reactor including an inner pipe (1) and an outer pipe (2) coaxially arranged and spirals being continuously installed in the longitudinal direction on the outer circumference of the inner pipe (1) to form a flow path for a heat medium so that the sealing between the spirals (3) and the outer pipe (2) is maintained, wherein the gasket comprises:

a frame (20) including a bottom (22) and both lateral sides (24) so that the gasket is opened upwardly to define a channel (21) therein in the longitudinal direction thereof, the frame being formed of a metal sheet so as to have a "U" shape in cross-section; and a cushion plate (40) coupled to the bottom of the frame in the longitudinal direction of the frame (20) so as to be positioned within the channel (21), the cushion plate being formed of a synthetic resin material, whereby the both lateral sides (24) of the frame (20) are fittingly coupled to both circumferential outer sides of spirals (3) such that the cushion plate (40) abuts against the outer circumference of the spirals (3) in a state in which the spirals (3) are inserted into the channel (21).

7. The gasket according to claim 6, wherein the frame (20) of the gasket (10) further comprises one or more incised grooves (28) formed on the both lateral sides (24) thereof in the longitudinal direction thereof in such a fashion as to be spaced apart from one another.

8. The gasket according to claim 7, wherein the frame (20) of the gasket (10) is formed by pressing a metal sheet made of a stainless steel material, and the cushion plate (40) is formed of polytetra fluoroethylene (PTFE).

9. The gasket according to claim 6, wherein the frame (20) of the gasket (10) is formed by pressing a metal sheet made of a stainless steel material, and the cushion plate (40) is formed of polytetra fluoroethylene (PTFE).

* * * * *